US012522205B2

(12) United States Patent
Mizoguchi

(10) Patent No.: US 12,522,205 B2
(45) Date of Patent: Jan. 13, 2026

(54) PARKING ASSIST SYSTEM

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 252 days.

(21) Appl. No.: 18/301,743

(22) Filed: Apr. 17, 2023

(65) Prior Publication Data

US 2023/0249677 A1 Aug. 10, 2023

Related U.S. Application Data

(63) Continuation of application No. PCT/JP2021/047089, filed on Dec. 20, 2021.

(51) Int. Cl.
*B60W 30/06* (2006.01)
*B60R 99/00* (2009.01)
*B62D 15/02* (2006.01)

(52) U.S. Cl.
CPC ....... *B60W 30/06* (2013.01); *B60W 2530/201* (2020.02); *B60W 2710/207* (2013.01); *B60W 2720/24* (2013.01)

(58) Field of Classification Search
CPC ........... B60W 30/06; B60W 2530/201; B60W 2720/24
See application file for complete search history.

(56) References Cited

U.S. PATENT DOCUMENTS

| | | | | |
|---|---|---|---|---|
| 11,305,756 B2* | 4/2022 | Yamanaka | ......... | B62D 15/0285 |
| 2016/0272244 A1* | 9/2016 | Imai | ................ | B62D 15/0285 |
| 2017/0129486 A1* | 5/2017 | Nakada | ............... | G06V 20/586 |
| 2018/0281793 A1* | 10/2018 | Terayama | ......... | B60W 30/0956 |
| 2021/0179079 A1* | 6/2021 | Hara | ................... | B60W 30/06 |

FOREIGN PATENT DOCUMENTS

| JP | 2005-313775 A | 11/2005 |
|---|---|---|
| JP | 2021-94932 A | 6/2021 |

* cited by examiner

*Primary Examiner* — Erin D Bishop
*Assistant Examiner* — Mahmoud M Kazimi
(74) *Attorney, Agent, or Firm* — Rimon P.C.

(57) ABSTRACT

A parking assist system includes an environment information obtainer and a parking assist controller. The parking assist controller includes an available parking space detector, a target guiding route setter, a target stop position setter, and a steering controller. The steering controller turns a steered wheel of a vehicle and fixes the steered wheel to a steering angle at which the vehicle starts to be reversed at a target stop position for turning the vehicle along a target guiding route. The steering controller also turns the steered wheel to a steering angle at which the vehicle starts to be reversed to an available parking space at a target stop position for parking the vehicle in a state in which the vehicle is in line with the available parking space.

4 Claims, 14 Drawing Sheets

| STEERING WHEEL ANGLE θh [deg] | LATERAL MOVEMENT AMOUNT X [m] | LONGITUDINAL MOVEMENT AMOUNT Y [m] |
|---|---|---|
| 90 | -22.0487 | -23.8759 |
| 180 | -10.8709 | -12.7016 |
| 270 | -7.10833 | -8.97305 |
| 360 | -5.19974 | -7.10402 |
| 450 | -3.97736 | -5.97485 |

PARKING ASSIST SYSTEM

CROSS-REFERENCE TO RELATED APPLICATIONS

This application is continuation of International Application No. PCT/JP2021/047089, filed on Jan. 1, 2022, the entire contents of which are hereby incorporated by reference.

BACKGROUND

The present disclosure relates to a parking assist system.

Hitherto, a parking assist system assists a driver in parking a vehicle in a parking space defined by parking space lines to reduce the burden of the driver. In such a parking assist system, while the driver is running the vehicle in a parking lot, a control unit detects vacant parking spaces and displays them on a monitor. The driver then selects a desired one of the displayed parking spaces. Then, the control unit sets a guiding route to park the vehicle in the selected parking space. The control unit then automatically guides the vehicle along the guiding route into the parking space.

The control unit may perform the following control to perpendicular park the vehicle backwards in the detected parking space, for example, as disclosed in Japanese Unexamined Patent Application Publication No. 2021-94932. First, the control unit calculates a path (route) from the current position of the vehicle to a parking position in the detected parking space via a position at which the vehicle is turned. Then, the control unit executes driving processing to drive the vehicle along the calculated path. The control unit first causes the vehicle to advance and temporarily stop at the vehicle turning position, and then guides the vehicle to the parking space backwards while turning a steered wheel of the vehicle. When the vehicle has parked in the parking space, the control unit completes the driving processing.

A typical automatic parking processing for parking the vehicle perpendicular to parking space lines in the parking space from the vehicle turning position involves the following control operation, for example. The control unit first reverses the vehicle at a slow speed while gradually turning the steered wheel and then gradually returns the steered wheel to park the vehicle between and in parallel with the left and right lines of the parking space.

Before starting to reverse the vehicle from the vehicle turning position toward the parking space, the vehicle temporarily stops at the vehicle turning position. This involves the simultaneous execution of two types of transition control when reversing the vehicle, that is, the control for starting to turn the steered wheel and the control for starting to accelerate the vehicle which is moving at a slow speed. This makes the control operation complicated.

Additionally, a guiding route (path) to the parking space is set based on the current position of the vehicle. The positional relationship between the current position of the vehicle and a target parking space is different every time the vehicle parks in the parking space. This involves the calculation of the guiding route to the target parking space, which makes the calculation complicated.

In view of the above-described background, it is desirable to provide a parking assist system that can easily perform the transition control when automatically parking a vehicle in a parking space, that is, transition control for turning and returning a steered wheel of the vehicle and transition control for accelerating and decelerating the vehicle, while a guiding route for guiding the vehicle from the vehicle turning position to the parking space can be easily calculated.

SUMMARY

An aspect of the disclosure provides a parking assist system including an environment information obtainer and a parking assist controller. The environment information obtainer is configured to obtain environment information around a vehicle in a parking lot. The parking assist controller is configured to automatically park the vehicle in reverse in a parking space, based on the environment information obtained by the environment information obtainer. The parking assist controller includes an available parking space detector, a target guiding route setter, a target stop position setter, and a steering controller. The available parking space detector is configured to detect an available parking space in the parking lot, based on the environment information obtained by the environment information obtainer. The target guiding route setter is configured to set, in a case where the available parking space is detected by the available parking space detector, a target guiding route for guiding the vehicle in reverse to the available parking space, based on a width of the vehicle and a width of a driving lane on which the vehicle is traveling. The target stop position setter is configured to set a target stop position for parking the vehicle at a smallest steering angle, on the target guiding route set by the target guiding route setter near the available parking space, and to set, on the target guiding route, a target stop position for turning the vehicle at which the vehicle starts to be reversed after being stopped. The steering controller is configured to, at the target stop position for turning the vehicle set by the target stop position setter, turn a steered wheel of the vehicle and fix the steered wheel to a steering angle at which the vehicle starts to be reversed along the target guiding route. The steering controller is configured to, at the target stop position for parking the vehicle in a state in which the vehicle is in line with the available parking space, turn the steered wheel to a steering angle at which the vehicle starts to be reversed to the available parking space .

An aspect of the disclosure provides a parking assist system including circuitry. The circuitry is configured to automatically park a vehicle in reverse in a parking space, based on environment information obtained by an environment information obtainer. The environment information is information around a vehicle in a parking lot. The circuitry is configured to detect an available parking space in the parking lot based on the environment information. The circuitry is configured to set, in a case where the available parking space is detected, a target guiding route for guiding the vehicle in reverse to the available parking space at a smallest steering angle, based on a width of the vehicle and a width of a driving lane on which the vehicle is traveling. The circuitry is configured to set a target stop position for parking the vehicle, on the set target guiding route near the available parking space. The circuitry is configured to set, on the target guiding route, a target stop position for turning the vehicle at which the vehicle starts to be reversed after being stopped. The circuitry is configured to, at the target stop position for turning the vehicle set by the target stop position setter, turn a steered wheel of the vehicle and fix the steered wheel to a steering angle at which the vehicle starts to be reversed. The circuitry is configured to, at the target stop position for parking the vehicle in a state in which the vehicle is in line with the available parking space, turn the steered wheel to a steering angle at which the vehicle starts to be reversed to the available parking space.

DETAILED DESCRIPTION

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
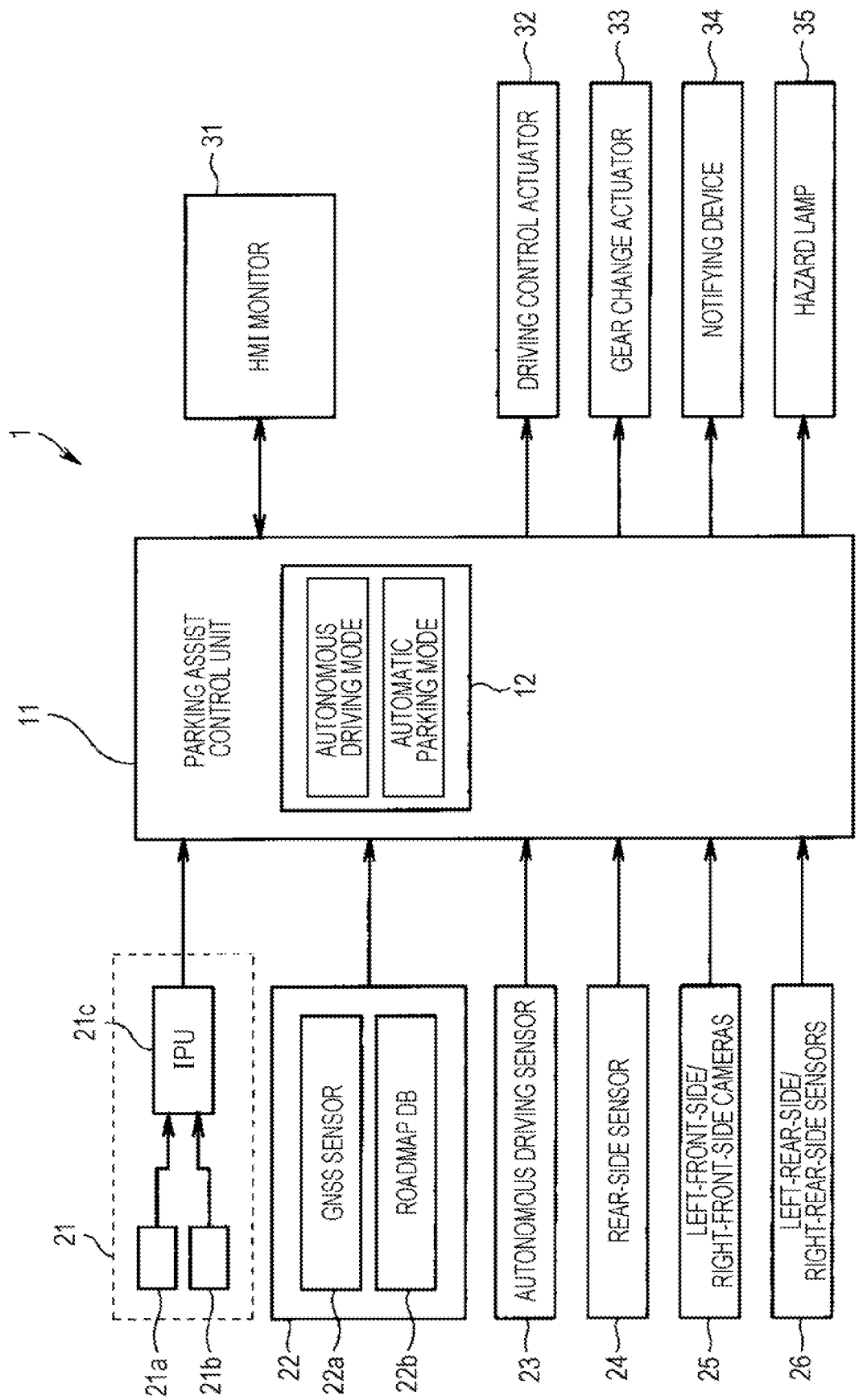
FIG. 1 is an overall schematic diagram of a parking assist system.
Figure 2:
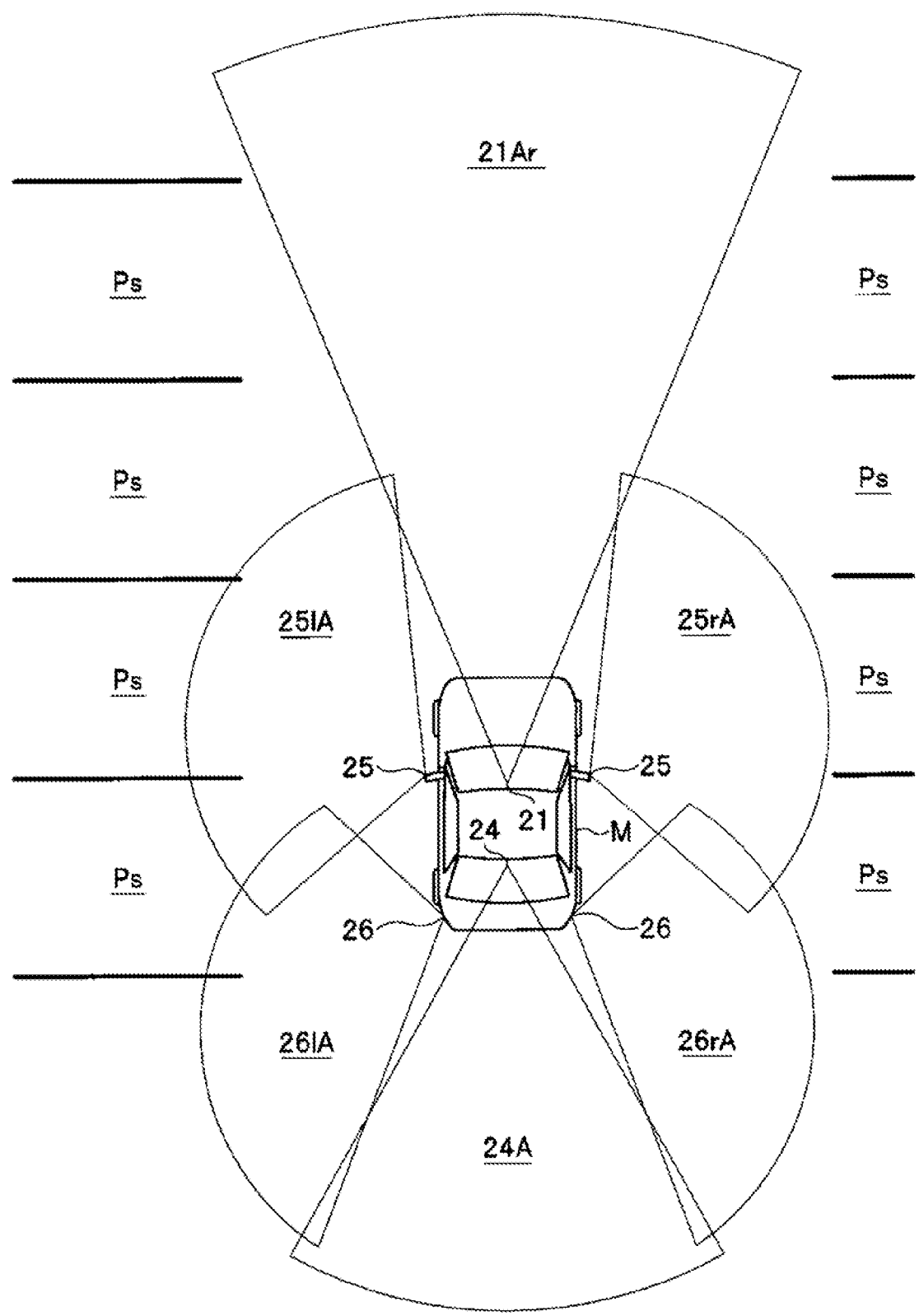
FIG. 2 is a schematic view for explaining search areas of cameras and sensors installed in a vehicle.

A parking assist system 1 illustrated in FIG. 1 is installed in a vehicle M (see FIG. 2). The parking assist system 1 includes a driving assist control unit 11. In one example, the driving assist control unit 11 may serve as a "parking assist controller". The driving assist control unit 11 may be constituted by a microcontroller including a CPU, a RAM, a ROM, a rewritable non-volatile memory (such as a flash memory or an EEPROM), and/or a peripheral device. The CPU may also be called a MPU (Microprocessor) or a processor. Instead of a CPU, a GPU (Graphics Processing Unit) or a GSP (Graph Streaming Processor) may be used. Alternatively, a CPU, a GPU, and a GSP may be selectively combined and used. The ROM may store programs and fixed data, such as those for executing processing by the CPU. The RAM may serve as a work area used for the CPU and temporarily stores various items of data used by the CPU.

The driving assist control unit 11 includes a mode setter 12. The mode setter 12 has an autonomous driving mode and an automatic parking mode. When a driver who drives the vehicle M (also referred to herein simply as "driver") selects a desired one of the modes, the driving assist control unit 11 executes the selected mode.

The autonomous driving mode is executed by the driving assist control unit 11 in the following manner. Based on vehicle position information obtained by a GNSS sensor 22*a* of a map locator unit 22, which will be discussed later, the driving assist control unit 11 performs map matching to match the position of the vehicle M onto a roadmap stored in a roadmap database 22*b*. The driving assist control unit 11 then causes the vehicle M to autonomously drive along a preset target traveling road in a self-driving zone where the vehicle may operate in the autonomous driving mode. On a driving road where autonomous driving is difficult, the driving assist control unit 11 performs known driving controls, such as vehicle-to-vehicle distance control (ACC: Adaptive Cruise Control), ALK (Active Lane Keep) control, and LDP (Lane Departure Prevention) control to cause the vehicle M to drive along a lane and, if a leading vehicle is detected, to follow the leading vehicle.

The automatic parking mode is executed by the driving assist control unit 11 in the following manner. When the vehicle M has entered a parking lot and the driver has selected the automatic parking mode, the driving assist control unit 11 searches for an available parking space and automatically parks the vehicle M in the detected available parking space.

Sensors and units that obtain information on the driving state (including the position and the direction) of the vehicle M and environment information around the vehicle M, which are used for executing the autonomous driving mode and the automatic parking mode, are coupled to the input side of the driving assist control unit 11.

In this embodiment, as the sensors and units used for executing the autonomous driving mode and the automatic parking mode of the mode setter, a camera unit 21, a map locator unit 22, an autonomous driving sensor 23, a rear-side sensor 24, left-front-side/right-front-side cameras 25, and left-rear-side/right-rear-side sensors 26 are provided. The rear-side sensor 24 obtains information on the environment at a rear side of the vehicle M. In one embodiment of the disclosure, the camera unit 21, the rear-side sensor 24, the left-front-side/right-front-side cameras 25, and the left-rear-side/right-rear-side sensors 26 may serve as "an environment information obtainer".

The camera unit 21 includes an image sensor. In this embodiment, the camera unit 21 includes a stereo camera and an image processing unit (IPU) 21c. The stereo camera is constituted by a main camera 21a and a sub-camera 21b and uses CCDs or CMOSs, for example, as imaging elements. The main camera 21a and the sub-camera 21b have a predetermined base line length and are located on a front side of the vehicle M at a position above a rear-view mirror and near a windshield. The main camera 21a and the sub-camera 21b are disposed horizontally symmetrically from the center along the width of the vehicle M with a space therebetween. The camera unit 21 processes, by using the IPU 21c, an image of a front-side imaging area 21Ar illustrated in FIG. 2 obtained by the main camera 21a and the sub-camera 21b as environment information, and sends the processed image to the driving assist control unit 11.

The map locator unit 22 includes a GNSS (Global Navigation Satellite System) sensor 22a and the roadmap database 22b. The GNSS sensor 22a receives positioning signals emitted from multiple positioning satellites so as to obtain position coordinates of the vehicle M. The roadmap database 22b is a large-capacity storage medium, such as an HDD, and stores roadmap information. As the roadmap information, the roadmap database 22b stores various types of road information (such as local roads, highways, freeways, road shapes, road directions, lane widths, and the number of lanes) used for executing the autonomous driving mode and also stores static information on parking lots (such as position information of the entrances and exits of parking lots and information on parking spaces of each parking lot) used for executing the automatic parking mode.

The driving assist control unit 11 performs map matching to match the position coordinates (latitude, longitude, and altitude) of the vehicle M obtained by the GNSS sensor 22a onto the roadmap indicated by the roadmap information stored in the roadmap database 22b, thereby estimating the position (current position) of the vehicle M on the roadmap.

The autonomous driving sensor 23 is a set of sensors used for autonomously driving the vehicle M. The autonomous driving sensor 23 is constituted by sensors, such as a vehicle velocity sensor that detects the velocity of the vehicle M, a yaw rate sensor that detects a yaw rate acting on the vehicle M, and a longitudinal acceleration sensor that detects a longitudinal acceleration of the vehicle M.

The rear-side sensor 24 is constituted by a combination of a monocular camera using CCDs or CMOSs, for example, as imaging elements and one or more of an ultrasonic sensor, a millimeter wave radar, a microwave radar, an infrared sensor, a laser radar, and LiDAR (Light Detection And Ranging), and searches a rear-side area 24A of the vehicle M. Alternatively, the rear-side sensor 24 may be a stereo camera constituted by a main camera and a sub-camera, as in the above-described camera unit 21.

The left-front-side/right-front-side cameras 25 are image sensors using CCDs or CMOSs, for example, as imaging elements and are respectively installed on the outer sides of side-view mirrors provided on the left and right sides of the vehicle M. As illustrated in FIG. 2, a left-front-side area 25lA and a right-front-side area 25rA of the vehicle M are imaged by the left-front-side/right-front-side cameras 25 and are subjected to predetermined image processing. From information obtained by the left-front-side/right-front-side cameras 25 and subjected to predetermined image processing, the driving assist control unit 11 obtains information on a parking lot, such as parking space lines that define the left and right sides of each parking space, vehicles parked in parking spaces, and distances between adjacent parked vehicles, which are seen on the left-front and right-front sides of the vehicle M when the vehicle M is passing by.

The left-rear-side/right-rear-side sensors 26 are scanning sensors, such as millimeter radars, microwave radars, and LiDARs. The left-rear-side/right-rear-side sensors 26 are respectively installed on the left and right ridges of a rear bumper of the vehicle M, for example. The left-rear-side/right-rear-side sensors 26 respectively scan an area from the rear side to the left side and an area from the rear side to the right side, that is, an area (left-rear-side area) 26lA and an area (right-rear-side areas) 26rA (see FIG. 2), which are difficult to recognize by the left-front-side/right-front-side cameras 25, and receive waves reflected by targets, such as parked vehicles, outer walls, and moving objects. Based on information from the left-rear-side/right-rear-side sensors 26, the driving assist control unit 11 obtains environment information, such as the distances from the vehicle M to the targets and the directions of the targets. Reference signs Ps . . . Ps in FIG. 2 represents parking spaces where vehicles can park side by side. The left and right sides of each parking space Ps are defined by parking space lines.

The driving assist control unit 11 is coupled to an HMI (Human Machine Interface) monitor 31. On the HMI monitor 31, the following screens, for example, are displayed. A driving mode selection screen is displayed to ask the driver whether to select the autonomous driving mode or the automatic parking mode as the assist mode to be executed by the driving assist control unit 11. When automatic parking is started, a screen is displayed to indicate the positional relationship of the vehicle M to a target parking space. As the HMI monitor 31, a multi-information display of a combination meter or a navigation display device (navigation monitor) of a car navigation system may be used.

A driving control actuator 32, a gear change actuator 33, a notifying device 34, and a hazard lamp 35 are coupled to the output side of the driving assist control unit 11.

The driving control actuator 32 is a set of actuators including a power actuator, an electric power steering (EPS) actuator, and a brake actuator, for example, which assist driving of the vehicle M. The power actuator controls output from drive sources, such as an engine and an electric motor. The EPS actuator controls driving of the EPS motor. The brake actuator adjusts a brake fluid pressure to be applied to a brake wheel cylinder provided in each wheel.

The gear change actuator 33 is a mechanism for automatically switching the position (drive (D), reverse (R), and parking (P)) of an automatic transmission installed in the vehicle M in accordance with an instruction signal from the driving assist control unit 11. The notifying device 34 supplies various types of voice information to the driver while the autonomous driving mode or the automatic parking mode is being executed. The driving assist control unit 11 turns ON the hazard lamp 35 when starting automatic parking.

Figure 6:
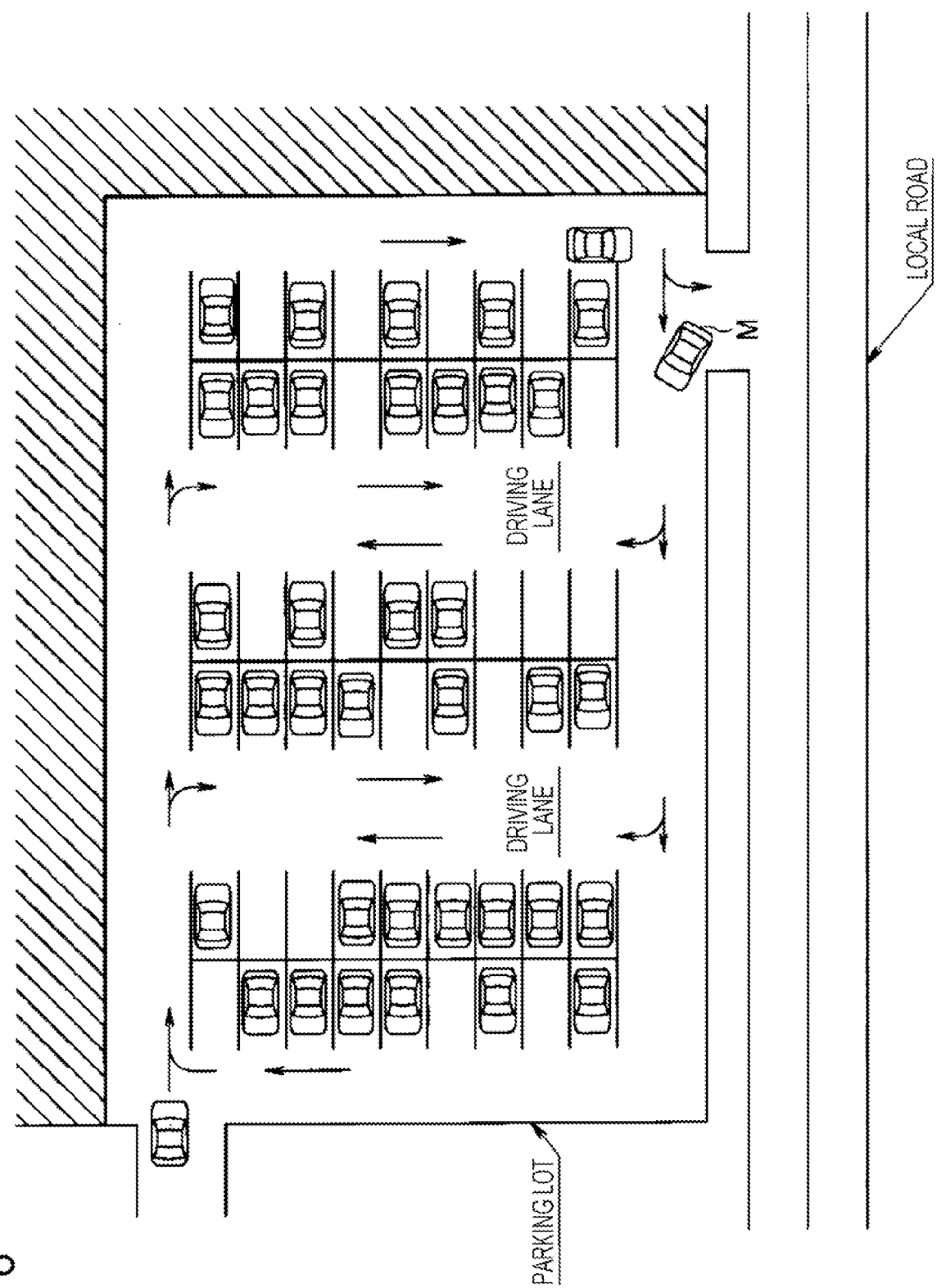
FIG. 6 is a schematic view illustrating the entirety of a parking lot.

The map locator unit 22 constantly checks the position (current position) of the vehicle on the roadmap against the roadmap data. Based on information from the map locator unit 22, if the driving assist control unit 11 has determined that the vehicle M has entered a parking lot from a local road, as illustrated in FIG. 6, it displays the driving mode selection screen, which asks the driver whether to select the automatic parking mode, on the HMI monitor 31. If the driver selects the automatic parking mode on the HMI monitor 31, the driving assist control unit 11 searches for an available parking space in the parking lot and then sets a target stop position Mf2 for parking the vehicle M in the detected available parking space. The driving assist control unit 11 then sets a target guiding route Rp from the target stop position Mf2 to a target stop position Mf1 for turning the vehicle M and then guides the vehicle M along the target guiding route Rp to automatically park the vehicle M in the parking space.

Figure 3:
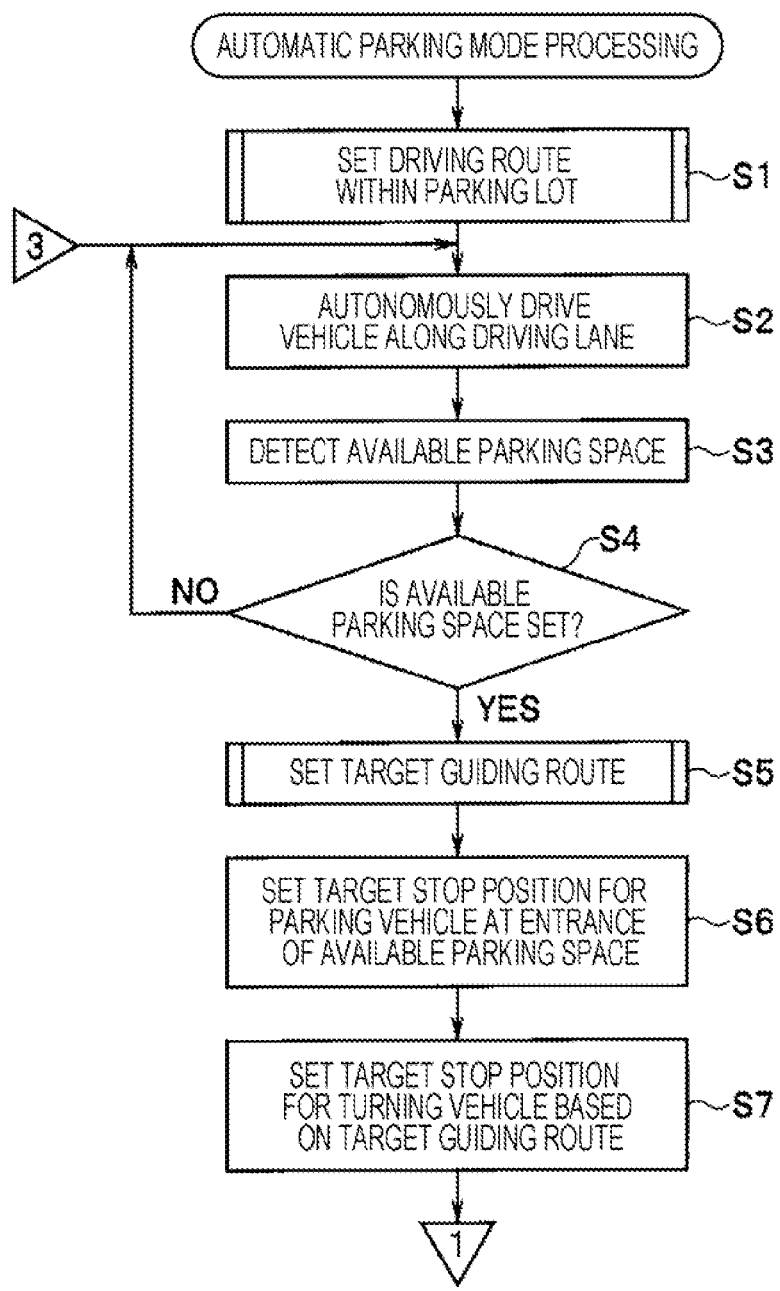
FIG. 3 is a flowchart (part 1) illustrating a processing routine in an automatic parking mode.
Figure 4:
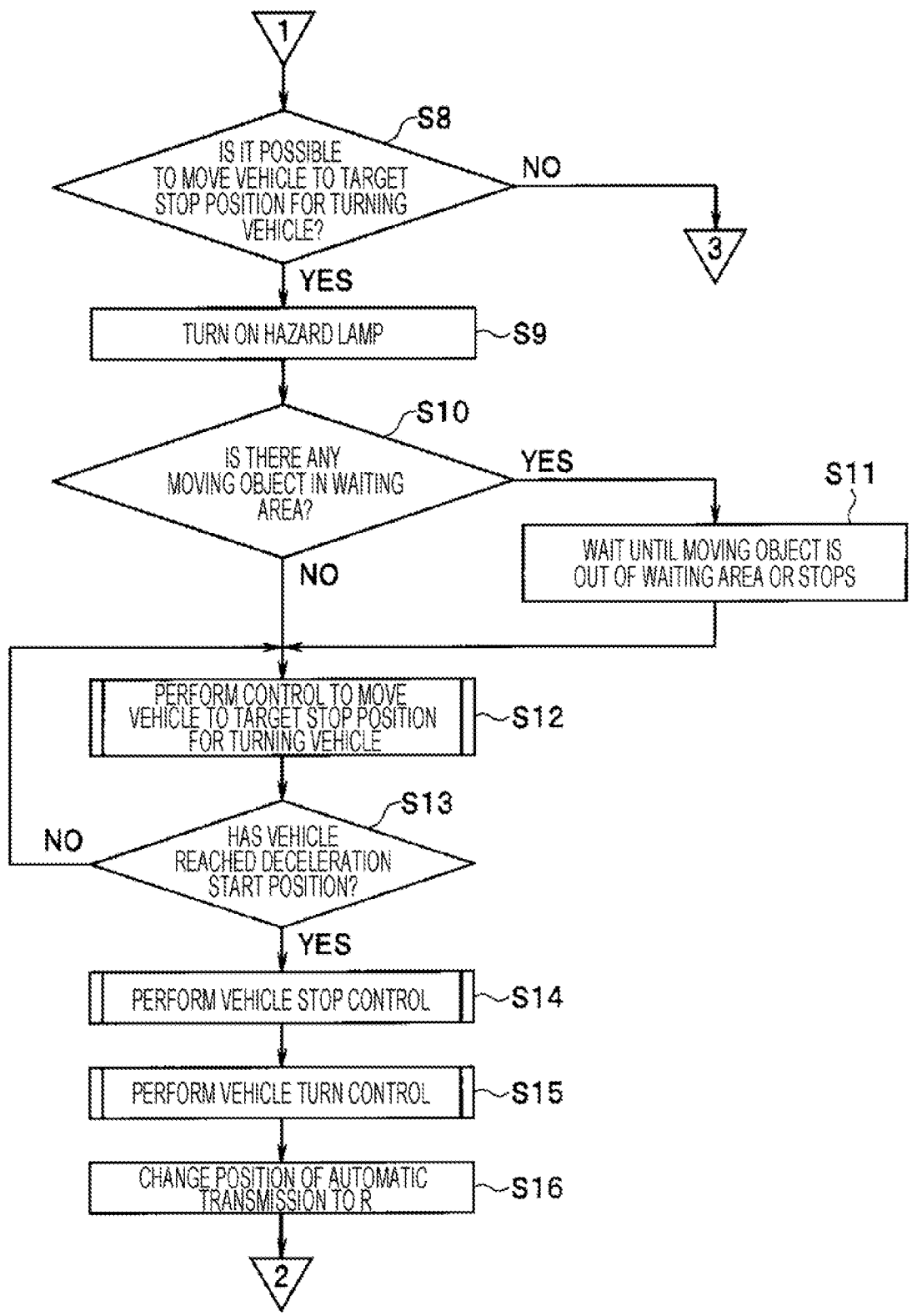
FIG. 4 is a flowchart (part 2) illustrating the processing routine in the automatic parking mode.
Figure 5:
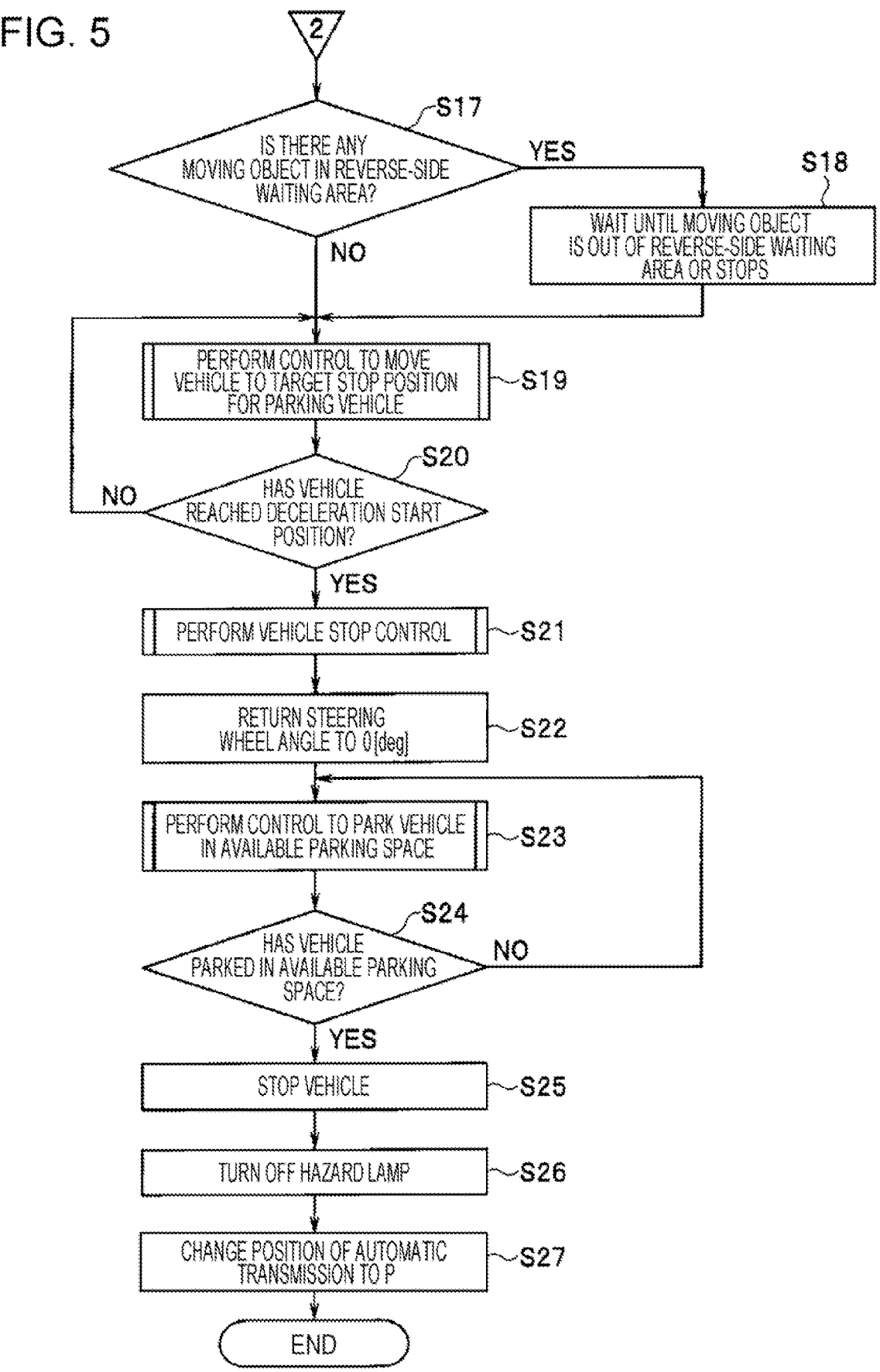
FIG. 5 is a flowchart (part 3) illustrating the processing routine in the automatic parking mode.

In one example, automatic parking control performed by the driving assist control unit 11 is executed in accordance with an automatic parking control routine illustrated in FIGS. 3 through 5.

This routine is executed at regular operation intervals after the automatic parking mode is selected. First, in step S1, a driving route for searching for a parking space for the vehicle M is set in driving lanes of the parking lot. The driving route is set in accordance with a preset driving condition. For example, if data on each driving lane in the parking lot and parking spaces Ps . . . Ps facing each driving lane is registered in the roadmap database 22b, the driving route is set based on this data.

When setting the driving route, if, as in the parking lot illustrated in FIG. 6, the driving lanes are one-way lanes (periphery of the parking lot in FIG. 6), the driving route is set in accordance with this rule. If details of the driving lanes in the parking lot are not registered in the roadmap information, the driving route may be set based on information on the driving environments on the left and right front sides of the vehicle M obtained by the camera unit 21 and the left-front-side/right-front-side cameras 25. For example, in the parking lot illustrated in FIG. 6, a driving lane which faces the perpendicular parking spaces Ps . . . Ps first detected by the vehicle M when entering the parking lot from the entrance is set as the driving route.

Then, in step S2, the vehicle M is autonomously driven at a slow speed (10 to 15 [Km/h]) along the driving lane. In step S3, among multiple parking spaces Ps . . . Ps arranged side by side along the driving lane, a parking space Psa where the vehicle M can park (hereinafter referred to as "available parking space Psa") is detected.

To detect the available parking space Psa by using the driving assist control unit 11, left-front-side/right-front-side images obtained by the left-front-side/right-front-side cameras 25 are converted into a two-dimensional plan view. Then, the distance between adjacent parked vehicles is compared with a parking area Mf which is sufficient for parking the vehicle M (hereinafter referred to as "sufficient parking area Mf") stored in a storage of the driving assist control unit 11.

Figure 7A:
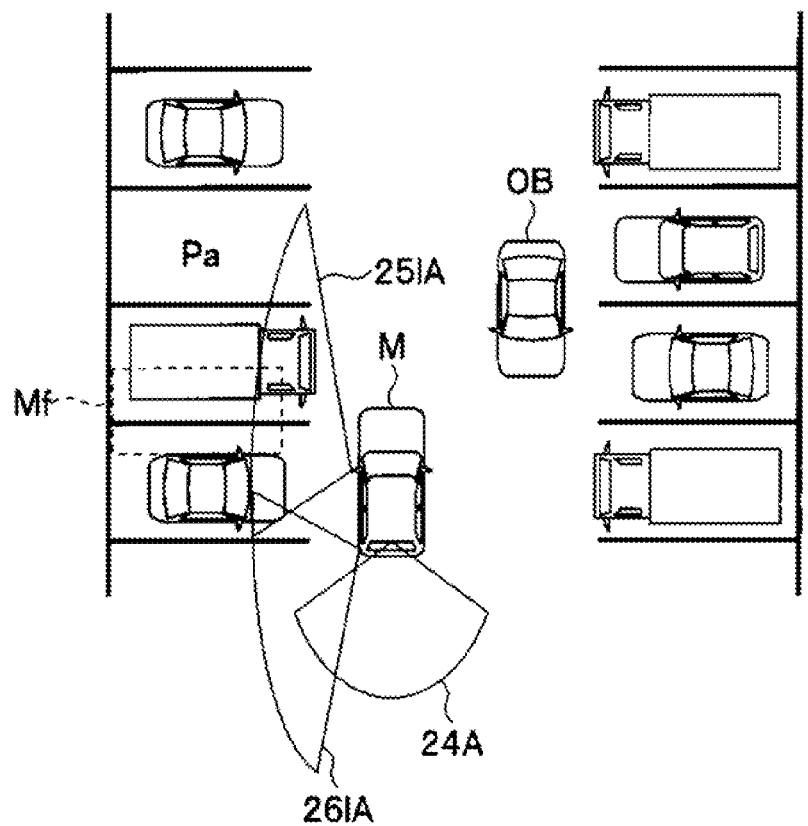
FIG. 7A illustrates a state in which a vehicle is searching for an available parking space.
Figure 7B:
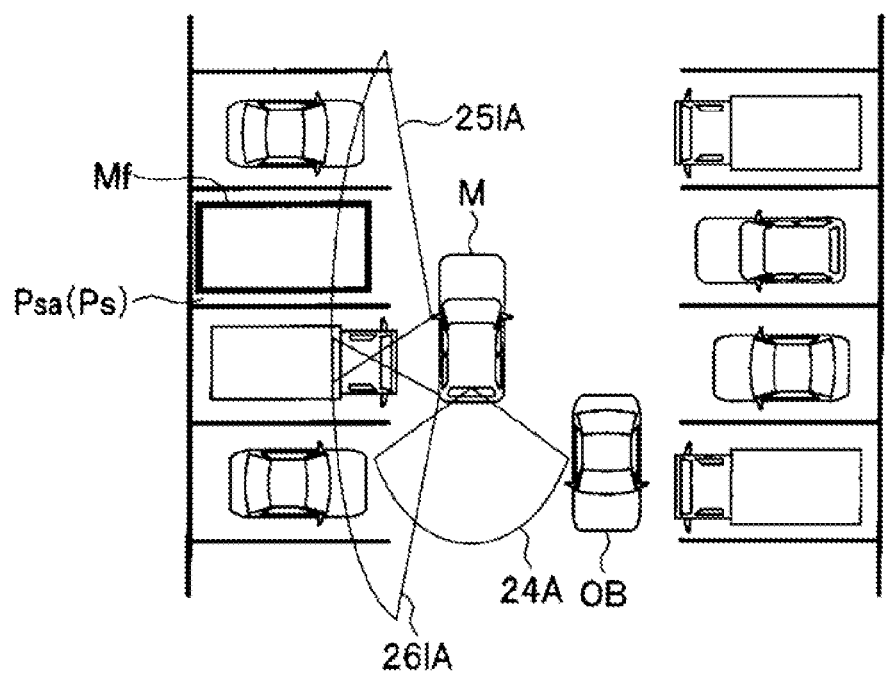
FIG. 7B illustrates a state in which the vehicle has detected an available parking space.
Figure 9A:
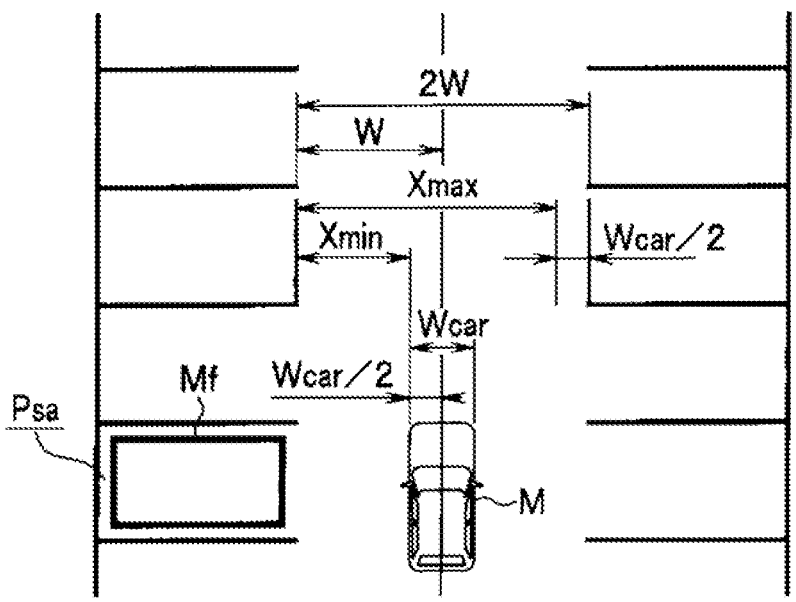
FIG. 9A illustrates a state in which a vehicle has detected a parking space.

For example, if the distance between adjacent parked vehicles is smaller than the sufficient parking area Mf, as indicated by the broken lines in FIG. 7A, the area between these parked vehicles is not sufficient to park the vehicle M and is excluded from available parking spaces. In contrast, as illustrated in FIGS. 7B and 9A, if the distance between adjacent parked vehicles is larger than the sufficient parking area Mf and the sufficient parking area Mf is included in the area between these parked vehicles, parking space lines that define the left and right sides of this parking space Ps are detected. If the parking space lines are detected, this parking space Ps is set as the available parking space Psa. The process then proceeds to step S4. If parking space lines that define the parking space Ps are not recognized, the driving assist control unit 11 proceeds a process to step S4 without setting this parking space Ps as the available parking space Psa.

In step S4, the driving assist control unit 11 checks whether the available parking space Psa is set. If the available parking space Psa is not set, the driving assist control unit 11 returns to step S2 to detect a next candidate of the available parking space Psa. If the available parking space Psa is set, the driving assist control unit 11 proceeds to step S5. In one embodiment, steps S3 and S4 may correspond to a process performed by an "available parking space detector".

Figure 9B:
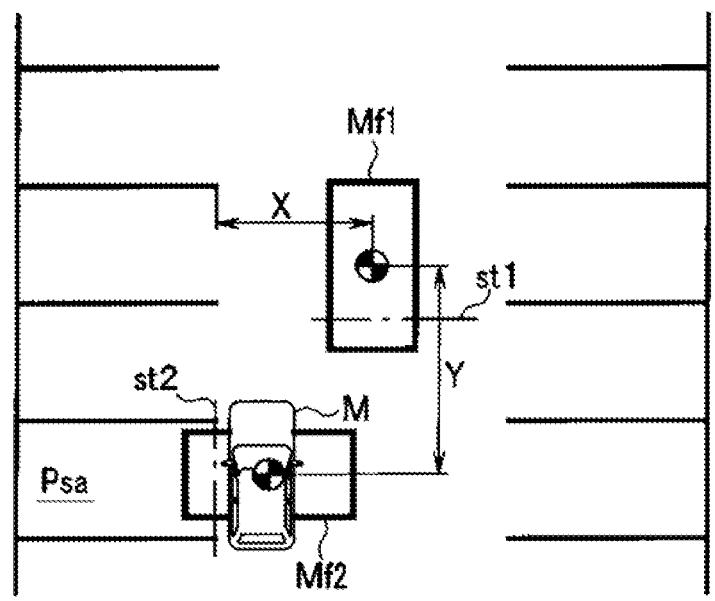
FIG. 9B illustrates a state in which a target stop position for parking the vehicle and a target position for turning the vehicle are set.

In step S5, the driving assist control unit 11 first drives the brake actuator of the driving control actuator 32 to apply the brakes so as to stop the vehicle M at the driving lane in front of the available parking space Psa, as illustrated in FIG. 9B. The driving assist control unit 11 then sets the target guiding route Rp for automatically parking the vehicle M backwards in the available parking space Psa. In one embodiment, step S5 may correspond to a process performed by a "target guiding route setter".

Figure 8:
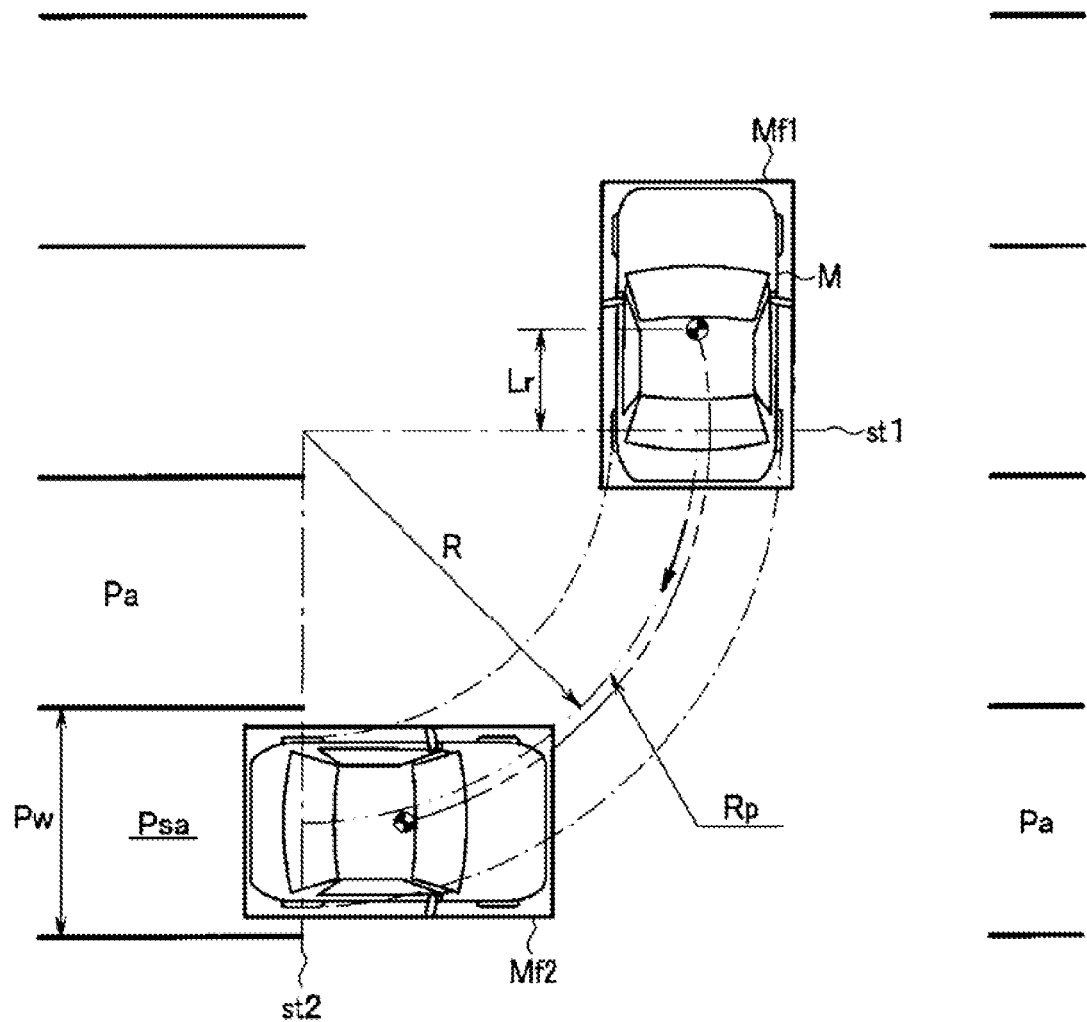
FIG. 8 illustrates a target route which is set during automatic parking.

In this embodiment, the target stop position Mf1 for turning the vehicle M can be set at a desired angle within the range of the target guiding route Rp with respect to the to the target stop position Mf2 for parking the vehicle M. For the sake of easy description, in this embodiment, the target stop position Mf1 is set at substantially right angles, that is, substantially in parallel with the extending direction of the driving lane. Hence, as illustrated in FIG. 8, the target guiding route Rp is set to a range in which the vehicle M can turn at a yaw angle θ of 90 [deg].

To set the target guiding route Rp, the driving assist control unit 11 detects the total width 2W of the driving lane (the distance between the edges of the parking space lines of parking spaces Ps . . . Ps at one side of the driving lane and those of the parking spaces Ps . . . Ps at the other side of the driving lane), as illustrated in FIG. 9A, based on the roadmap information stored in the roadmap database 22b or environment information on the front-side imaging area 21Ar obtained by the camera unit 21. The single width of the driving lane is indicated by W.

Then, the driving assist control unit 11 determines, based on a width Wcar of the vehicle M, the smallest steering angle, which is used for automatically parking the vehicle M in reverse, so that a lateral movement amount X satisfies the relationship expressed by the following expression.

$$W-(Wcar/2)<X<2W-(Wcar/2)$$

The lateral movement amount X is the distance by which the vehicle M moves from the edges of the parking space lines that define the available parking space Psa to the widthwise center (Wcar/2) of the vehicle M. As illustrated in FIG. 9A, a minimum lateral movement amount Xmin and a maximum lateral movement amount Xmax of the lateral movement amount X are expressed as follows.

$$W-(Wcar/2)=Xmin$$

$$2W-(Wcar/2)=Xmax$$

Based on a typical two-wheeled vehicle model illustrated in FIG. 10, the relationship of a steering angle δ of left and right front wheels of the vehicle M, which are the steered wheel, to the yaw rate γs acting on a center of gravity of the vehicle M and the relationship of the steering angle δ to the slip angle βs of the body of the vehicle M are as follows.

$$\gamma s=(V/L)\delta$$

$$\beta s=(Lr/L)\delta$$

Figures 10, 11:
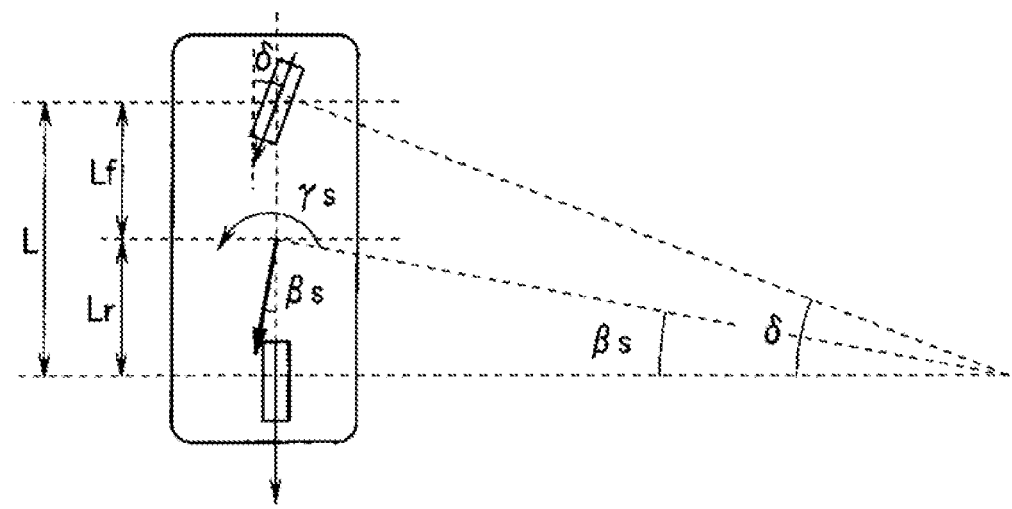
FIG. 10 illustrates a two-wheeled vehicle model.
FIG. 11 is a table indicating a lateral movement amount and a longitudinal movement amount when turning the vehicle, which are determined in accordance with a steered wheel angle based on the two-wheeled vehicle model.

In FIG. 10, L is the wheelbase, Lf is the distance from the front wheel axle to the center of gravity, and Lr is the distance from the center of gravity to the rear wheel axle.

A movement amount Xk+1 per sampling period Δt of the lateral movement amount X and a movement amount Yk+1 per sampling period Δt of a longitudinal movement amount Y, which is from the target stop position Mf2 for parking the vehicle M to the target stop position Mf1 for turning the vehicle M, are expressed by the following equations. In the following equations, k is a previously calculated value, k+1 is a currently calculated value, V is a reverse velocity of the vehicle M, and θ is the yaw angle.

$$Xk+1=Xk+Vk \cdot \cos(\theta k+\beta s)\Delta t$$

$$Yk+1=Yk+Vk \cdot \sin(\theta k+\beta s)\Delta t$$

$$\theta k+1=\theta k+(\gamma k \cdot \Delta t)$$

Based on these equations, the lateral movement amount X and the longitudinal movement amount Y can be calculated in a regular manner from the reverse velocity V and the steering angle δ per sampling period Δt. For example, under the conditions that the vehicle M is turned at V=5 [Km/h] by βs=90 [deg] in the reverse direction with a steered wheel angle θh in 90 [deg] increments, the lateral movement amount X[m] and the longitudinal movement amount Y[m] at the center of gravity can be calculated in a regular manner, as illustrated in FIG. 11. The increments of the steering wheel angle θh [deg] illustrated in FIG. 11 are only examples and they may be set in greater details.

For example, in FIG. 11, if the lateral movement amount X is 8 [m], the steered wheel angle θh may be selected from 270 [deg], 360 [deg], and 450 [deg]. Among these candidates of the steered wheel angle θh, 270 [deg], which is the smallest steering angle, is selected. Hence, the target guiding route Rp can be set from the lateral movement amount X and the longitudinal movement amount Y that are calculated based on the steering angle δ corresponding to the steered wheel angle θh=270 [deg].

In this embodiment, as illustrated in FIG. 8, the target guiding route Rp from the target stop position Mf2 for parking the vehicle M to the target stop position Mf1 for turning the vehicle M is set in the traveling route at the intermediate position of the left and right rear wheel axle of the vehicle M. On the other hand, the lateral movement amount X and the longitudinal movement amount Y illustrated in FIG. 11 are based on the center of gravity. The lateral movement amount X and the longitudinal movement amount Y are thus first converted into values based on a distance Lr from the center of gravity to the rear wheel axle, and then, the target guiding route Rp is set. As a result, when the yaw angle θ is 90 [deg], the target guiding route Rp is formed substantially as an arc-like shape having a turning radius R. Alternatively, the target guiding route Rp may be set in a traveling route based on the center of gravity of the vehicle M.

Then, in step S6, the target stop position Mf2 for parking the vehicle M is set at the entrance of the available parking space Psa so that the vehicle M is located on an extension line of the available parking space Psa. As illustrated in FIG. 8, in the embodiment, a stop position st2 is set at a position in the target stop position Mf2 corresponding to the rear wheel axle of the vehicle M. The stop position st2 is set at a predetermined position in front of the available parking space Psa, such as a position perpendicular to a line connecting to the edges of the parking space lines. The widthwise center of the target stop position Mf2 is set to the center of a width Pw of the available parking space Psa between their parking space lines.

Then, in step S7, based on the target stop position Mf2 for parking the vehicle M (θ=0 [deg]), the target stop position Mf1 for turning the vehicle M is set at a position of θ=90 [deg] along the target guiding route Rp set in step S5. In one embodiment, steps S6 and S7 may correspond to a process performed by a "target stop position setter".

Figure 12:
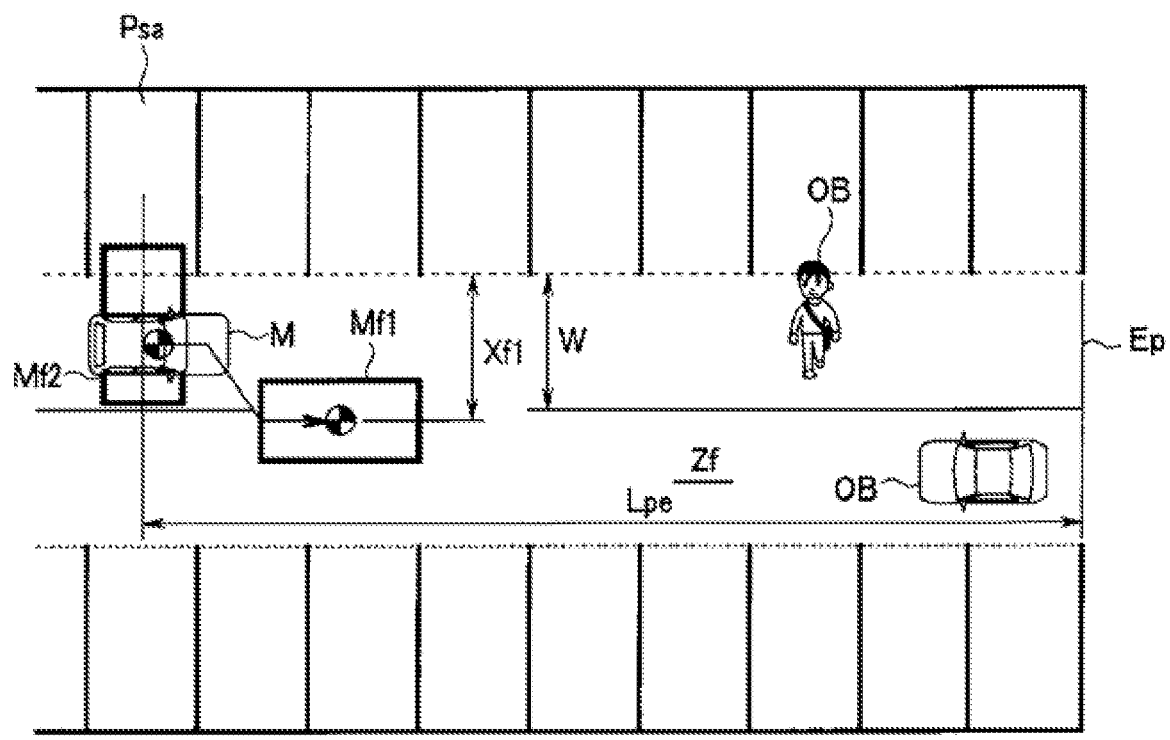
FIG. 12 illustrates the position of the vehicle at which the vehicle can move to the target stop position for turning.

Then, in step S8, the driving assist control unit 11 checks whether it is possible to move the vehicle M to the target stop position Mf1 for turning the vehicle M. As illustrated in FIG. 12, whether the vehicle M can be moved to the target stop position Mf1 may be determined based on a lateral width Xf of the target stop position Mf1 with respect to the single width W of the driving lane. That is, if the lateral width Xf1 from the widthwise center of the target stop position Mf1 to a line connecting to the edges of the parking space lines close to the target stop position Mf2 for parking the vehicle M is set to the widthwise center of the target stop position Mf1 exceeds a half of the single width W of the driving lane (Xf1>W/2), the driving assist control unit 11 determines that it is possible to move the vehicle M to the target stop position Mf1 and proceeds to step S9. If the lateral width Xf1 is smaller than or equal to a half of the single width W of the driving lane (Xf1≤W/2), the driving assist control unit 11 determines that it is not possible to move the vehicle M to the target stop position Mf1 and returns to step S2.

In step S9, the driving assist control unit 11 sends an ON signal to the hazard lamp 35 to cause it to blink and then proceeds to step S10. In step S10, before moving the vehicle M to the target stop position Mf1, the driving assist control unit 11 checks whether a moving object OB, such as a pedestrian, a bicycle, or an oncoming vehicle, is detected in a preset waiting area Zf. In this embodiment, the waiting area Zf has a width equal to the total width 2W of the driving lane and a length of a predetermined distance Lpe from the widthwise center of the target stop position Mf2 for parking the vehicle Mf2 toward the target stop position Mf1. The predetermined distance Lpe is set to be a shorter one of a preset distance (20 [m], for example) and the distance from the widthwise center of the target stop position Mf2 to an end point Ep of the parking area.

If the moving object OB is detected in the waiting area Zf from environment information obtained from a front-side image captured by the camera unit 21 and left-front-side/right-front-side images captured by the left-front-side/right-front-side cameras 25, the driving assist control unit 11 branches off to step S11. If the moving object OB is not found in the waiting area Zf, the driving assist control unit 11 proceeds to step S12.

In step S11, the driving assist control unit 11 waits until the moving object OB moves out of the waiting area Zf or the moving object OB stops ahead of the vehicle M which would be located at the target stop position Mf1 for turning the vehicle M. If the driving assist control unit 11 determines that the moving object OB moves out of the waiting area Zf or stops ahead of the vehicle M, it proceeds to step S12.

When proceeding to step S12 from step S10 or step S11, the driving assist control unit 11 starts autonomous driving for moving the vehicle M to the target stop position Mf1. That is, the driving assist control unit 11 first sets a target traveling route for moving the vehicle M from the current stop position of the vehicle M to the target stop position Mf1 which is set along the driving lane. The driving assist control unit 11 then causes the brake actuator of the driving control actuator 32 to stop applying the brakes and drives the power actuator to start the vehicle M. The driving assist control unit 11 also drives the EPS actuator to move the vehicle M to the target stop position Mf1 illustrated in FIG. 9B along the target traveling route.

Then, the driving assist control unit 11 proceeds to step S13 and checks whether the vehicle M has reached a preset deceleration start position, based on, for example, the position coordinates of the vehicle M obtained by the GNSS sensor 22a and the roadmap information stored in the roadmap database 22b. If the vehicle M has not yet reached the preset deceleration start position, the driving assist control unit 11 repeats step S12. If the vehicle M has reached the preset deceleration start position, the driving assist control unit 11 proceeds to step S14.

Figure 9C:
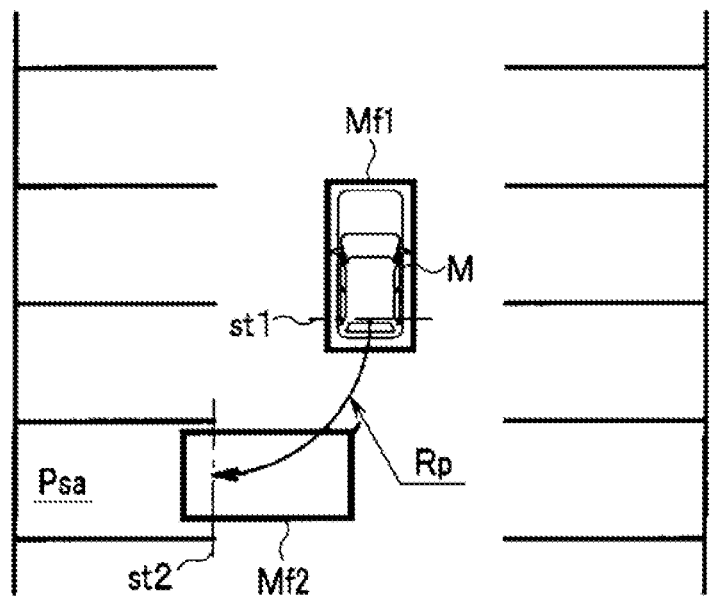
FIG. 9C illustrates a state in which the vehicle is moved to the target position for turning the vehicle.

In step S14, the driving assist control unit 11 performs vehicle stop control. In this vehicle stop control, the driving assist control unit 11 adjusts the output from the drive sources controlled by the power actuator and braking applied by the brake actuator so as to slow down the vehicle M to stop at the target stop position Mf1 for turning the vehicle M. As a result, as illustrated in FIG. 9C, the vehicle M stops at the target stop position Mf1 such that the rear wheel axle becomes aligned with a stop position st1. At this time, the steering angle δ is 0 [deg] (time t0 in FIG. 14).

The automatic parking control routine will be further described with reference to the time chart in FIG. 14. When proceeding from step S14 to step S15, the driving assist control unit 11 performs control to turn the left and right front wheels while the vehicle M is stopped. The driving assist control unit 11 drives the EPS actuator of the driving control actuator 32 to change the angle of the left and right front wheels to the steering angle δ set in step S5 and to fix this steering angle δ (time t1 to t2 in FIG. 14). In one embodiment, step S15 and later-described step S22 may correspond to a process performed by a "steering controller".

Then, the driving assist control unit 11 proceeds to step S16. In step 16, the driving assist control unit 11 drives the gear change actuator 33 to set the position of the automatic transmission to R (reverse), and then proceeds to step S17.

In step S17, the driving assist control unit 11 checks whether the moving object OB is detected in a reverse-side waiting area Zr, which is set from the vehicle M stopped at the target stop position Mf1 for turning the vehicle M toward the target stop position Mf2 for parking the vehicle M, based on environment information on the rear side detected by the rear-side sensor 24 and the left-rear-side/right-rear-side sensors 26.

Figure 13:
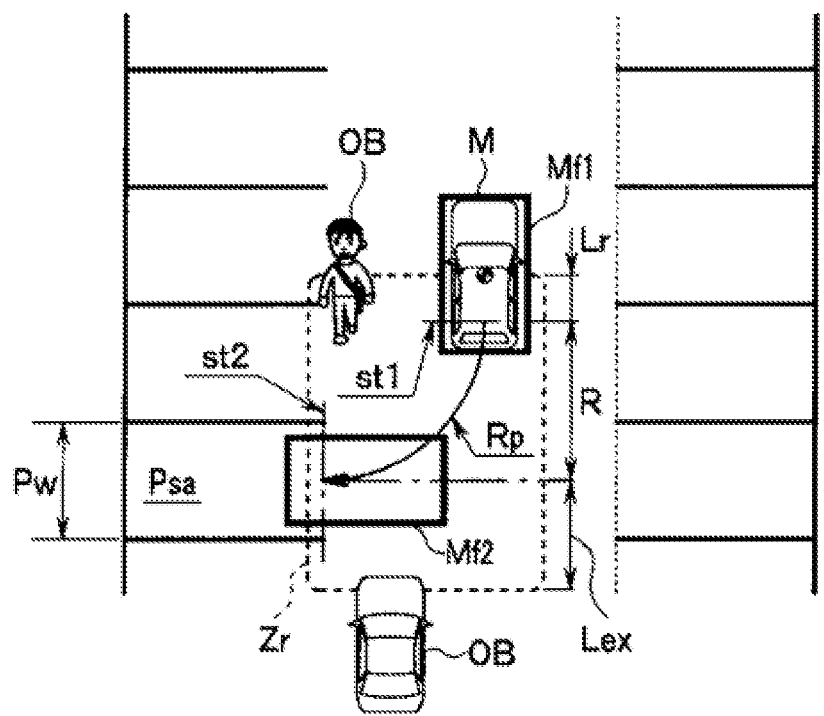
FIG. 13 illustrates a moving object detection region to be checked upon automatic parking.

As illustrated in FIG. 13, the width of the reverse-side waiting area Zr is set to a range from a position slightly extending from the edges of the parking space lines of the available parking space Psa close to the driving lane toward the other edges of the parking space lines to a position slightly extending from the target stop position Mf1 for turning the vehicle M toward the far side of the driving lane from the available parking space Psa. The length of the reverse-side waiting area Zr is set to a length of Lr+R+Lex from the center of gravity of the target stop position Mf1 to the target stop position for parking the vehicle Mf2. Lex is a predetermined length (parking space width Pw/2, for example) extending from the widthwise center of the target stop position Mf2 for parking the vehicle M .

If the moving object OB is detected in the reverse-side waiting area Zr or if there is a possibility that the moving object OB enter the reverse-side waiting area Zr, the driving assist control unit 11 determines that it is not possible to move the vehicle M to the target stop position Mf2 for parking the vehicle M and branches off to step S18. If the moving object OB is not found in the reverse-side waiting area Zr or if there is no possibility that the moving object OB enter the reverse-side waiting area Zr, the driving assist control unit 11 determines that the vehicle M can move to the target stop position Mf2, and proceeds to step S19.

It may be determined, for example, in the following manner, whether there is a possibility that the moving object OB enter the reverse-side waiting area Zr. The driving assist control unit 11 may compare a moving-object estimated time at which the moving object OB enters the reverse-side waiting area Zr ([distance from the moving object OB to the reverse-side waiting area Zr]/[moving velocity of the moving object OB]) with a vehicle estimated time at which the vehicle M reaches the target stop position Mf2 for parking the vehicle M ([distance from the vehicle M to the target stop position Mf2]/[velocity of the vehicle M]). If the moving-object estimated time is earlier than the vehicle estimated time, the driving assist control unit 11 determines that there is a possibility that the moving object OB enter the reverse-side waiting area Zr.

When branching off to step S18, the driving assist control unit 11 waits until the moving object OB moves out of the reverse-side waiting area Zr or it can be determined that another vehicle as a new moving object OB illustrated in FIG. 13 stops at a position out of the traveling route of the vehicle M from the target stop position Mf1 for turning the vehicle M to the target stop position Mf2 for parking the vehicle M. If the driving assist control unit 11 determines that the moving object OB moves out of the reverse-side waiting area Zr or it stops at a position out of the traveling route of the vehicle M, it proceeds to step S19. In one embodiment, steps S17 and S18 may correspond to a process performed by a "movement possibility determiner".

Figure 14:
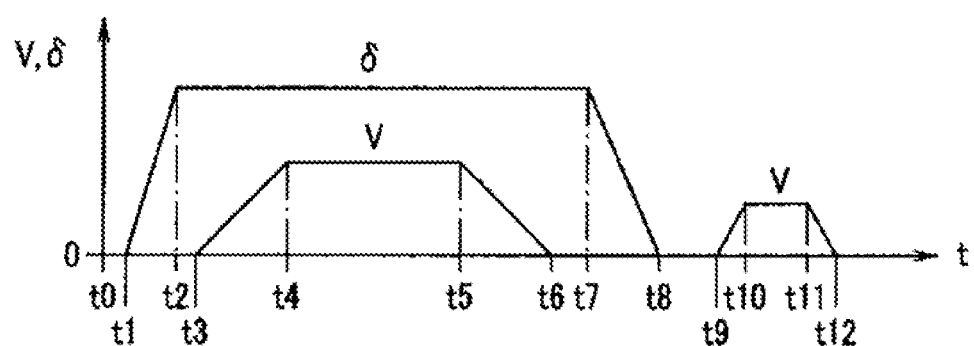
FIG. 14 is a time chart illustrating the relationship between the steering angle and the velocity of the vehicle when the vehicle is caused to park automatically.

When proceeding to step S19 from step S17 or step S18, the driving assist control unit 11 starts autonomous driving for moving the vehicle M to the target stop position Mf2 for parking the vehicle M (time t3 in FIG. 14).

That is, while fixing the left and right front wheels at the steering angle δ determined in step S15, the driving assist control unit 11 first cancels braking applied by the brake actuator (time t3 in FIG. 14) and then drives the power actuator to reverse the vehicle M at a preset slow speed (5 [Km/H], for example) (time t4 to t5 in FIG. 14). The driving assist control unit 11 then moves the vehicle M from the target stop position Mf1 for turning the vehicle M to the target stop position Mf2 for parking the vehicle M. At this time, since the steering angle δ is fixed, the vehicle M naturally moves along the target guiding route Rp illustrated in FIG. 9C toward the target stop position Mf2.

Then, the driving assist control unit 11 proceeds to step S20 and checks whether the vehicle M has reached the preset deceleration start position, based on, for example, the position coordinates of the vehicle M obtained by the GNSS sensor 22a and the roadmap information stored in the roadmap database 22b. If the vehicle M has not yet reached the preset deceleration start position, the driving assist control unit 11 repeats step S19. If the vehicle M has reached the preset deceleration start position, the driving assist control unit 11 proceeds to step S21. In one embodiment, steps S19 and S20, and later-described steps S23 and S24 may correspond to a process performed by a "movement controller".

In step S21, the driving assist control unit 11 performs vehicle stop control. In this vehicle stop control, the driving assist control unit 11 adjusts the output from the drive sources controlled by the power actuator and braking applied by the brake actuator so as to slow down the vehicle M to stop at the target stop position Mf2 for parking the vehicle M (time t5 to t6 in FIG. 14).

Figure 9D:
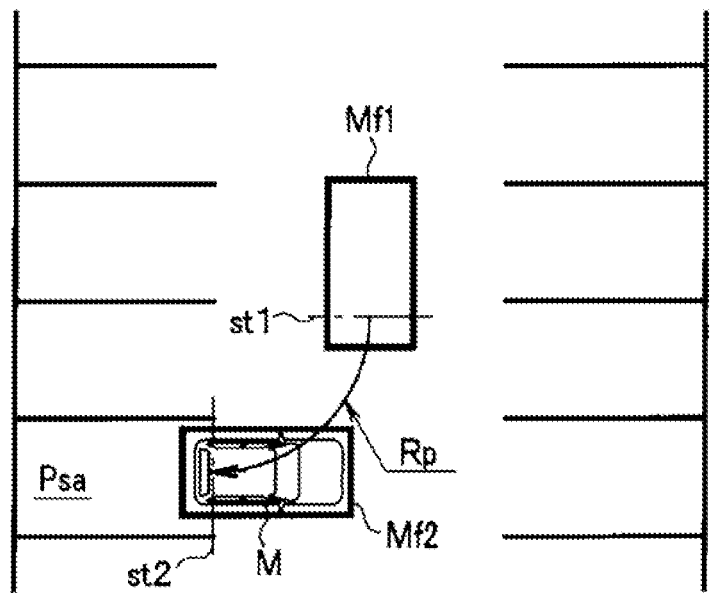
FIG. 9D illustrates a state in which the vehicle is moved to the target stop position for parking the vehicle.

As illustrated in FIG. 9D, the target stop position Mf2 for parking the vehicle M is set at the entrance of the available parking space Psa in line with the available parking space Psa. The vehicle M stops at the target stop position Mf2 such that the rear wheel axle becomes aligned with the stop position st2.

Then, the driving assist control unit 11 proceeds to step S22. In step S22, the driving assist control unit 11 returns the steered wheel angle θh (steering angle δ) to 0 [deg] while the vehicle M stops, and then proceeds to step S23 (time t7 to t8 in FIG. 14). As stated above, since the vehicle M is stopped in line with the available parking space Psa, the driving assist control unit 11 can park the vehicle M in the available parking space Psa without turning the steered wheel. The steered wheel angle θh (steering angle δ) may be other than 0 [deg] if the vehicle M can reverse in a state in which it is in line with with the available parking space Psa.

Figure 9E:
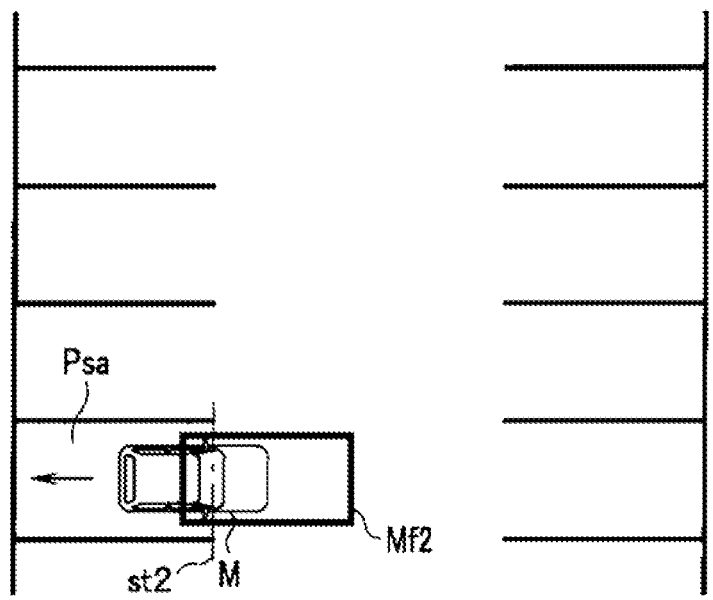
FIG. 9E illustrates a state in which the vehicle is entering the parking space.

Then, the driving assist control unit 11 proceeds to step 23 and starts driving control to park the vehicle M in the available parking space Psa. Then, as illustrated in FIG. 9E, the vehicle M starts to reverse toward the available parking space Psa while the velocity is being adjusted with the output from drive sources controlled by the power actuator and braking applied by the brake actuator (time t9 in FIG. 14). At this time, the steering angle δ is 0 [deg] and the vehicle M goes straight backwards.

Figure 9F:
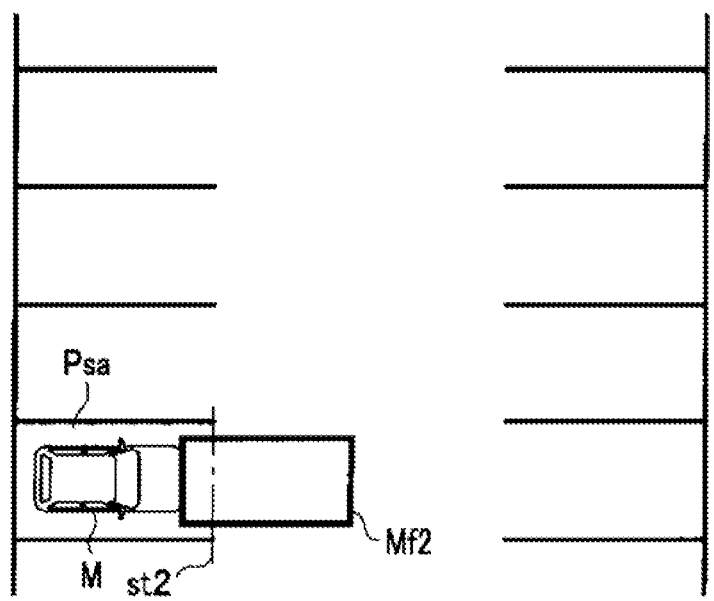
FIG. 9F illustrates a state in which the vehicle has parked in the parking space.

Then, the driving assist control unit 11 proceeds to step S24 and checks whether the vehicle M has parked in the available parking space Psa. If the vehicle M has not yet parked in the available parking space Psa, the driving assist control unit 11 repeats step S23 (time t9 to t12 in FIG. 14). If the driving assist control unit 11 determines that the vehicle M has parked in the available parking space Psa, as illustrated in FIG. 9F, it proceeds to step S25 and drives the brake actuator to apply the brakes to stop the vehicle M (time t12 in FIG. 14).

Then, the driving assist control unit 11 proceeds to step S26 and sends an OFF signal to the hazard lamp 35 to turn it OFF. The driving assist control unit 11 then proceeds to step S27 and drives the gear change actuator 33 to set the position of the automatic transmission to P (parking). Now the driving assist control unit 11 completes the routine.

As described above, according to the embodiment, as indicated by the time chart in FIG. 14, after turning the steered wheel while the vehicle M is stopped (time t1 to t2), the driving assist control unit 11 moves the vehicle M from the target stop position Mf1 for turning the vehicle M to the target stop position Mf2 for parking the vehicle M (time t3 to t6). Then, the driving assist control unit 11 returns the steered wheel angle θh (steering angle δ) to 0 [deg] while the vehicle M is stopped (time t7 to t8). Thus, in automatic parking, the transition control zone of the steering angle δ of the left and right front wheels (time t0 to t2 and time t7 to t8) and the acceleration/deceleration control zone (t3 to t4 and t5 to t6) do not temporally overlap each other. This makes the control operation simple.

The vehicle M is moved from the target stop position Mf1 for turning the vehicle M to the target stop position Mf2 for parking the vehicle M with the fixed steered wheel angle θh (steering angle δ). In one example, this makes it easy to calculate a guiding route to a parking space from the position at which the steered wheel is turned. In another example, since no control is performed on the steered wheel angle θh (steering angle δ) while the vehicle M is reversing, the initial position (target stop position Mf1 for turning the vehicle M) can be set with high precision. The vehicle M is guided to the target stop position Mf2 for parking the vehicle M with the fixed steered wheel angle θh (steering angle δ). The driver can thus easily predict the behavior of the vehicle M to park in the available parking space Psa and feel a sense of security.

The invention claimed is:

1. A parking assist system comprising:
an environment information obtainer configured to obtain environment information around a vehicle in a parking lot; and
a parking assist controller configured to automatically park the vehicle in reverse in a parking space, based on the environment information obtained by the environment information obtainer, the parking assist controller comprising:
an available parking space detector configured to detect an available parking space in the parking lot, based on the environment information obtained by the environment information obtainer;
a target guiding route setter configured to set, in a case where the available parking space is detected by the available parking space detector, a target guiding route for guiding the vehicle in reverse to the available parking space at a smallest steering angle, based on a width of the vehicle and a width of a driving lane on which the vehicle is traveling;
a target stop position setter configured to:
set a first target stop position on the target guiding route, the first target stop position being set on a side of the target guiding route that is adjacent to the available parking space, the first target stop position being a position at which the vehicle is aligned and from which straight backward movement causes the vehicle to enter the available parking space; and
set a second target stop position on the target guiding route, the second target stop position being set on a side of the target guiding route opposite the available parking space, the second target stop position being a position at which the vehicle is stopped after moving forward and before starting to be reversed along the target guiding route toward the first target stop position; and
a steering controller configured to:
turn a steered wheel of the vehicle to a first steering angle while the vehicle is stopped at the second target stop position, the first steering angle being an angle at which the vehicle is to be reversed along the target guiding route toward the first target stop position, and to hold the steered wheel at the first steering angle until the vehicle reaches and stops at the first target stop position; and
turn the steered wheel to a second steering angle while the vehicle is stopped at the first target stop position, the second steering angle being an angle at which the vehicle is to be reversed straight into the available parking space in a state in which the vehicle is aligned with the available parking space, and to hold the steered wheel at the second steering angle until the vehicle reaches and stops at a stop position within the available parking space; and
a movement controller configured to:
move the vehicle to the second target stop position and stop the vehicle at the second target stop position;
move the vehicle from the second target stop position to the first target stop position after the steered wheel is turned to the first steering angle at the second target stop position, and to stop the vehicle at the first target stop position; and move the vehicle from the first target stop position into the available parking space after the steered wheel is turned to the second steering angle at the first target stop position, and to stop the vehicle at a stop position within the available parking space.

2. The parking assist system according to claim 1, wherein the target stop position for parking the vehicle to be set by the target stop position setter is set in the driving lane, which faces the available parking space, so as to be in line with the available parking space, and the target stop position for turning the vehicle is set at a position at which the target stop position for parking the vehicle is turned at a certain angle.

3. The parking assist system according to claim 1, wherein the parking assist controller further comprises a movement possibility determiner configured to:

set a reverse-side waiting area in a moving direction of the vehicle to determine whether a moving object is detected in the reverse-side waiting area before the movement controller starts to move the vehicle from the target stop position for turning the vehicle to the target stop position for parking the vehicle; and stop moving the vehicle in a case where a moving object is detected in the reverse-side waiting area.

4. A parking assist system comprising:

circuitry configured to automatically park a vehicle in reverse in a parking space, based on environment information obtained by an environment information obtainer, the environment information being information around the vehicle in a parking lot, the circuitry configured to:

detect an available parking space in the parking lot based on the environment information;

set, in a case where the available parking space is detected, a target guiding route for guiding the vehicle in reverse to the available parking space at a smallest steering angle, based on a width of the vehicle and a width of a driving lane on which the vehicle is traveling;

set a first target stop position on the target guiding route, the first target stop position being set on a side of the target guiding route that is adjacent to the available parking space, the first target stop position being a position at which the vehicle is aligned and from which straight backward movement causes the vehicle to enter the available parking space;

set a second target stop position on the target guiding route, the second target stop position being set on a side of the target guiding route opposite the available parking space, the second target stop position being a position at which the vehicle is stopped after moving forward and before starting to be reversed along the target guiding route toward the first target stop position;

turn a steered wheel of the vehicle to a first steering angle while the vehicle is stopped at the second target stop position, the first steering angle being an angle at which the vehicle is to be reversed along the target guiding route toward the first target stop position, and to hold the steered wheel at the first steering angle until the vehicle reaches and stops at the first target stop position;

turn the steered wheel to a second steering angle while the vehicle is stopped at the first target stop position, the second steering angle being an angle at which the vehicle is to be reversed straight into the available parking space in a state in which the vehicle is aligned with the available parking space, and to hold the steered wheel at the second steering angle until the vehicle reaches and stops at a stop position within the available parking space;

move the vehicle to the second target stop position and stop the vehicle at the second target stop position;

move the vehicle from the second target stop position to the first target stop position after the steered wheel is turned to the first steering angle at the second target stop position, and to stop the vehicle at the first target stop position; and move the vehicle from the first target stop position into the available parking space after the steered wheel is turned to the second steering angle at the first target stop position, and to stop the vehicle at a stop position within the available parking space.

* * * * *